United States Patent
Park et al.

(10) Patent No.: US 8,437,601 B2
(45) Date of Patent: May 7, 2013

(54) METHOD OF REPRODUCING INTERACTIVE GRAPHIC STREAMS FROM INFORMATION STORAGE MEDIUM

(75) Inventors: Sung-wook Park, Seoul (KR); Seong-jin Moon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1424 days.

(21) Appl. No.: 12/039,936

(22) Filed: Feb. 29, 2008

(65) Prior Publication Data

US 2008/0155638 A1 Jun. 26, 2008

Related U.S. Application Data

(63) Continuation of application No. 10/822,772, filed on Apr. 13, 2004.

(30) Foreign Application Priority Data

Aug. 16, 2003 (KR) ................................. 2003-56725
Feb. 3, 2004 (KR) ................................. 2004-6976

(51) Int. Cl.
*H04N 5/775* (2006.01)

(52) U.S. Cl.
USPC .......................................... 386/230; 725/136

(58) Field of Classification Search .................. 386/230; 725/136
See application file for complete search history.

(56) References Cited

U.S. PATENT DOCUMENTS

| | | | |
|---|---|---|---|
| 5,915,066 A | 6/1999 | Katayama | |
| 6,009,234 A | 12/1999 | Taira et al. | |
| 6,112,011 A | 8/2000 | Hisatomi | |
| 6,118,445 A | 9/2000 | Nonomura et al. | |
| 6,246,402 B1 | 6/2001 | Setogawa et al. | |
| 6,289,165 B1 | 9/2001 | Abecassis | |
| 6,301,638 B1 | 10/2001 | Suzuki et al. | |

(Continued)

FOREIGN PATENT DOCUMENTS

| | | |
|---|---|---|
| CN | 1232254 | 10/1999 |
| EP | 0677843 B1 | 4/1995 |

(Continued)

OTHER PUBLICATIONS

Japanese Office Action issued on Aug. 3, 2010, in corresponding Japanese Patent Application No. 2006-523120 (3 pages).

(Continued)

*Primary Examiner* — Thai Tran
*Assistant Examiner* — Jose Mesa
(74) *Attorney, Agent, or Firm* — NSIP Law

(57) ABSTRACT

A method of reproducing one interactive graphics stream among one or more interactive graphics streams from an information storage medium, via a reproduction apparatus providing a visual display of interactive graphics, including obtaining attribute information in a player status register in the reproducing apparatus, and reading and reproducing one of the interactive graphics streams corresponding to the obtained attribute information among one or more interactive graphics streams from the information storage medium, the one interactive graphics stream being used to control reproduction of audio-visual data and being reproduced with the audio-visual data. With the method, text information written in a variety of languages and data shared by those languages are multiplexed and stored in one menu stream such that data is not redundantly stored and less storage space is wasted.

8 Claims, 5 Drawing Sheets

U.S. PATENT DOCUMENTS

| | | | |
|---|---|---|---|
| 6,526,426 | B1 | 2/2003 | Lakritz |
| 7,765,158 | B2 * | 7/2010 | Sugimoto et al. ............... 705/51 |
| 2001/0008753 | A1 | 7/2001 | Wakamoto |
| 2002/0078144 | A1 | 6/2002 | Lamkin et al. |
| 2003/0086690 | A1 | 5/2003 | Chung et al. |
| 2005/0166223 | A1 | 7/2005 | Krasinski |
| 2006/0236218 | A1 | 10/2006 | Yahata et al. |
| 2007/0077029 | A1 * | 4/2007 | Yahata et al. ................... 386/95 |

FOREIGN PATENT DOCUMENTS

| | | |
|---|---|---|
| EP | 0714098 B1 | 1/1999 |
| EP | 1 209 681 | 5/2002 |
| EP | 1099218 B1 | 9/2002 |
| EP | 1 400 968 | 3/2004 |
| JP | 09-037199 | 2/1997 |
| JP | 09-259507 | 10/1997 |
| JP | 11-225307 A | 8/1999 |
| JP | 2000-348466 | 12/2000 |
| JP | 2003-046951 A | 2/2003 |
| JP | 2004-342175 A | 12/2004 |
| KR | 2003-38933 | 5/2003 |
| WO | WO 2005/002219 | 1/2005 |

OTHER PUBLICATIONS

Office Action issued in Korean Patent Application No. 2004-6976 on Apr. 18, 2006.

U.S. Appl. No. 10/822,772, filed Apr. 13, 2004, Sung-wook Park et al., Samsung Electronics Co., Ltd.

U.S. Appl. No. 12/061,736, filed Apr. 3, 2008, Sung-Wook Park et al., Samsung Electronics Co., Ltd.

Search Report dated Mar. 6, 2008 of the European Patent Application No. 04774130.1.

Chinese Office Action issued on Apr. 7, 2010, in corresponding Chinese Application No. 200710112505.7 (4 pages).

Non-Final Rejection issued on May 10, 2011, in corresponding Japanese Patent Application No. 2010-132327 (6 pages including English translation).

Non-Final Rejection issued on May 10, 2011, in corresponding Japanese Patent Application No. 2010-132328 (7 pages including English translation).

Japanese Office Action issued on Jan. 10, 2012 in counterpart Japanese Patent Application No. 2011-066550 (5 pages).

German Opposition Paper issued Mar. 28, 2011 in counterpart European Patent Application No. 04774130.1 (9 pages, in German).

European Summons to attend Oral Proceedings issued on Sep. 11, 2012 in counterpart European Patent Application No. 04774130.1 (6 pages, in English).

International Search Report issued on Oct. 15, 2004 in International Application No. PCT/KR2004/001760 (in English).

Written Opinion of the International Searching Authority issued on Oct. 15, 2004 in International Application No. PCT/KR2004/001760 (in English).

* cited by examiner

METHOD OF REPRODUCING INTERACTIVE GRAPHIC STREAMS FROM INFORMATION STORAGE MEDIUM

CROSS-REFERENCE TO RELATED APPLICATIONS

This application is a continuation of U.S. patent application Ser. No. 10/822,772, filed Apr. 13, 2004 in the United States Patent and Trademark Office, currently pending, and claims the benefit of Korean Patent Application No. 2003-56725, filed on Aug. 16, 2003 and Korean Patent Application No. 2004-6976, filed on Feb. 3, 2004, respectively, in the Korean Intellectual Property Office, the disclosures of which are incorporated herein by reference.

BACKGROUND OF THE INVENTION

1. Field of the Invention

The present invention relates to interactive data, and more particularly, to an information storage medium containing an interactive graphics stream used in controlling reproduction of multimedia contents, and a reproducing apparatus and method thereof.

2. Description of the Related Art

In order to control multimedia contents provided to a user, a menu to manage the multimedia contents is provided together with the multimedia contents to the user. Through this menu, contents producers provide a variety of options of managing the multimedia contents to the user. The user is provided with functions such as playing of a movie by chapters and viewing of bonus tracks, in addition to simple reproduction of audiovisual (AV) streams, such as playing movies.

A menu to manage the multimedia contents includes text information. Here, text information refers to information solely formed of text. In other words, text information is information written in different languages, including Korean, English, and Japanese, about the multimedia contents. A contents producer who produces and provides multimedia contents to the user produces menus in a variety of languages and stores the contents in a storage medium so that the contents can be sold to people in various languages. In the conventional DVD, data forming this menu are produced and stored separately for each language. This is to simplify controlling the data in a DVD reproducing apparatus.

FIG. 1 is a diagram showing menu streams for respective languages stored in a language unit of a conventional DVD. Here, a menu stream is a stream in which a menu that is produced and includes audio, video, sub-picture, and highlight information is multiplexed as one stream.

Referring to FIG. 1, it can be seen that a menu stream 130 is prepared separately for each language.

FIG. 2 is a block diagram of a reproducing apparatus in which a DVD reproducing apparatus selects a language according to predetermined system parameters and reproduces a menu stream written in the selected language.

Referring to FIG. 2, the DVD reproducing apparatus selects a menu corresponding to a language set by a user in advance according to a predetermined rule. Preset language information is stored in a system parameter storage unit 210. A menu language selection unit 220 reads, for example, a menu language code stored in system parameter #0 (SPRM0), and selects a menu stream having the same value as the menu language code, by selecting one among the menu streams described above while referring to FIG. 1. A decoder 230 reproduces the selected menu stream.

If menus are thus prepared for respective languages, storage space is seriously wasted because non-text information such as video data, which consumes a large amount of space and does not have a language limitation, is included in menus prepared for the respective languages. In addition, there is a problem in that it is impossible to change a language while video data is being reproduced. Also, because a method of selecting a menu is predetermined, the menu cannot be selected by criteria other than languages.

SUMMARY OF THE INVENTION

The present invention provides a method and apparatus of selecting and reproducing an interactive graphics stream according to a result of executing a program that selects an interactive graphics stream desired by a user among a plurality of interactive graphics streams, and an information storage medium containing the plurality of interactive graphics streams.

According to an aspect of the present invention, there is provided a method of selecting and reproducing one interactive graphics stream among at least one interactive graphics streams. The method includes loading and executing a program that selects an interactive graphics stream among the at least one interactive graphics streams, and reading and reproducing the interactive graphics stream selected by the program.

Additional aspects and/or advantages of the invention will be set forth in part in the description which follows and, in part, will be obvious from the description, or may be learned by practice of the invention.

According to another aspect of the present invention, there is provided an information storage medium including audiovisual (AV) data, navigation data that is a set of navigation commands related to reproduction of the AV data, and at least one interactive graphics stream among which one interactive graphics stream is selected and reproduced according to a result of executing a program that selects one among the at least one interactive graphics streams.

According to another aspect of the present invention, there is provided an apparatus for selecting and reproducing one interactive graphics stream among at least one interactive graphics stream. The apparatus includes a processor which loads and executes a program that selects an interactive graphics stream among the at least one interactive graphics streams, and a decoder which reads and reproduces the interactive graphics stream selected by the program.

According to another aspect of the present invention, there is provided a computer readable recording medium having embodied thereon a computer program for executing the method in a computer.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
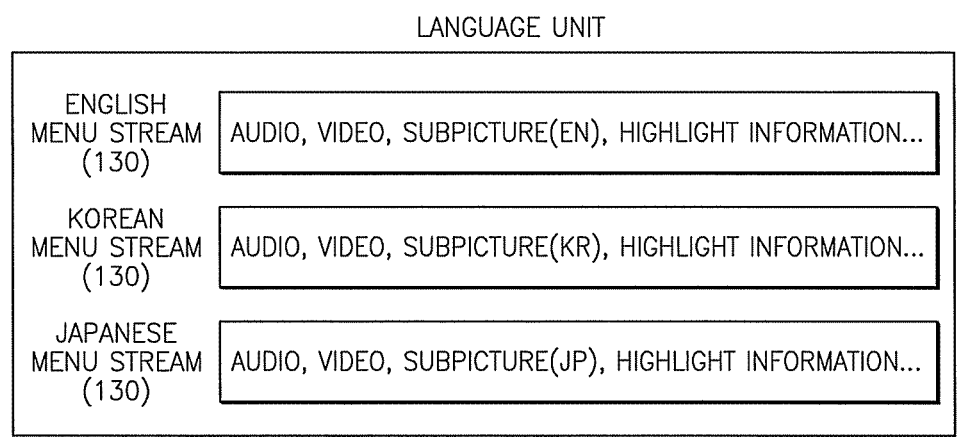
FIG. 1 is a diagram showing menu streams for respective languages stored in a language unit of a DVD.
Figure 2:
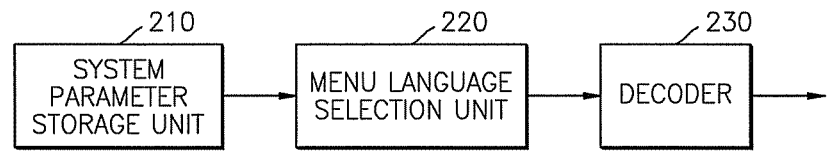
FIG. 2 is a block diagram of a reproducing apparatus in which a DVD reproducing apparatus selects a language according to predetermined system parameters and reproduces a menu stream written in the selected language.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
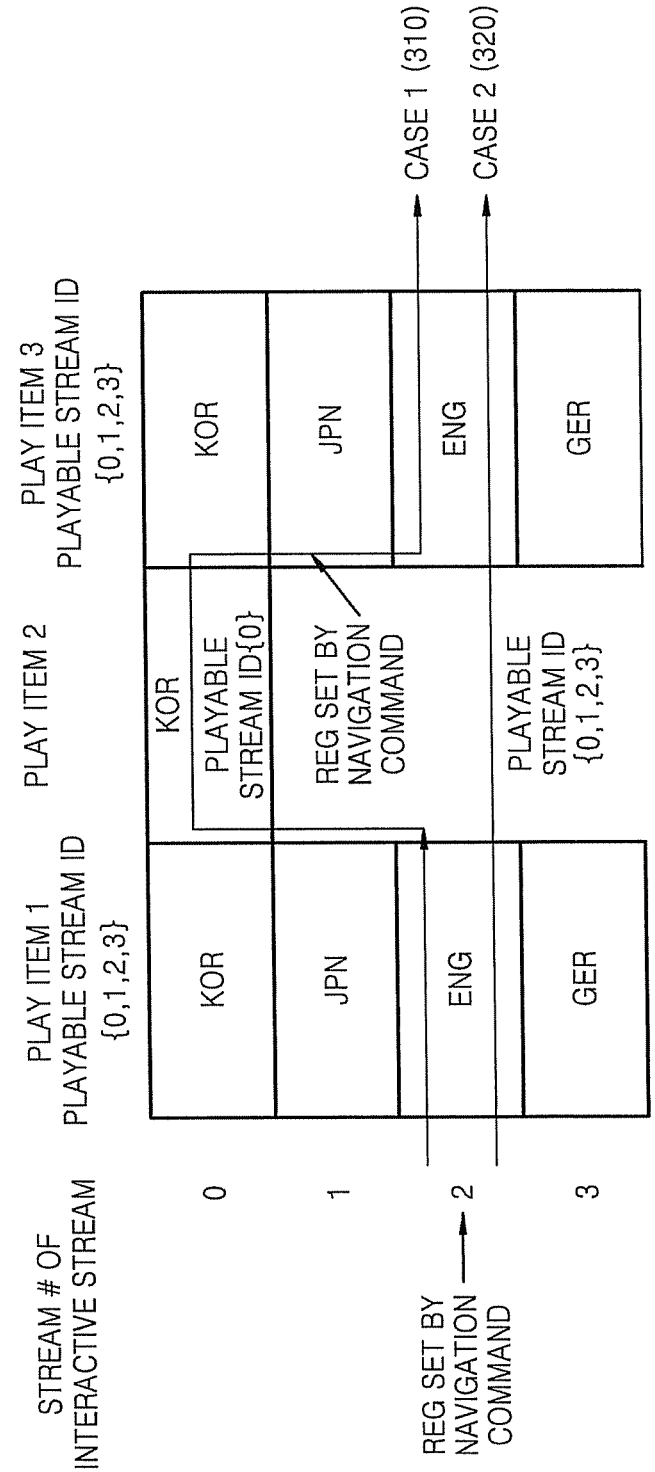
FIG. 3 is a diagram showing that among interactive graphics streams written in respective languages, an interactive graphics stream corresponding to a value stored in a register is reproduced according to an embodiment of the present invention.

FIG. 3 shows that among interactive graphics streams written in respective languages, an interactive graphics stream corresponding to a value stored in a system register is reproduced.

Here, an interactive graphics stream can be changed only by navigation commands related to reproduction of multimedia data and cannot be changed by a user's operation. A navigation command has a plurality of navigation registers, and among the navigation registers, there is a player status register (PSR) indicating the status of the reproducing apparatus. The player status register will be explained later referring to table 1. Among player status registers, an example of a register related with language will be described below.

Assuming, for example, that a value initially stored in the system register is 2, a menu stream written in English is reproduced. If reproduction of one playitem is finished, a subsequent playitem should be reproduced. However, there may be no playitem written in English; thus, in this case, after a playitem written in Korean is reproduced, a playitem written in English may be reproduced as shown in case 1 310, or after the Korean playitem is skipped, the English playitem may be directly reproduced as shown in case 2 320. Thus, while a menu stream written in a predetermined language is reproduced, in order to reproduce a menu stream written in a different language, a process in which a value stored in a predetermined register is read and is compared with an ID value corresponding to the language of the menu stream is performed.

Figure 4:
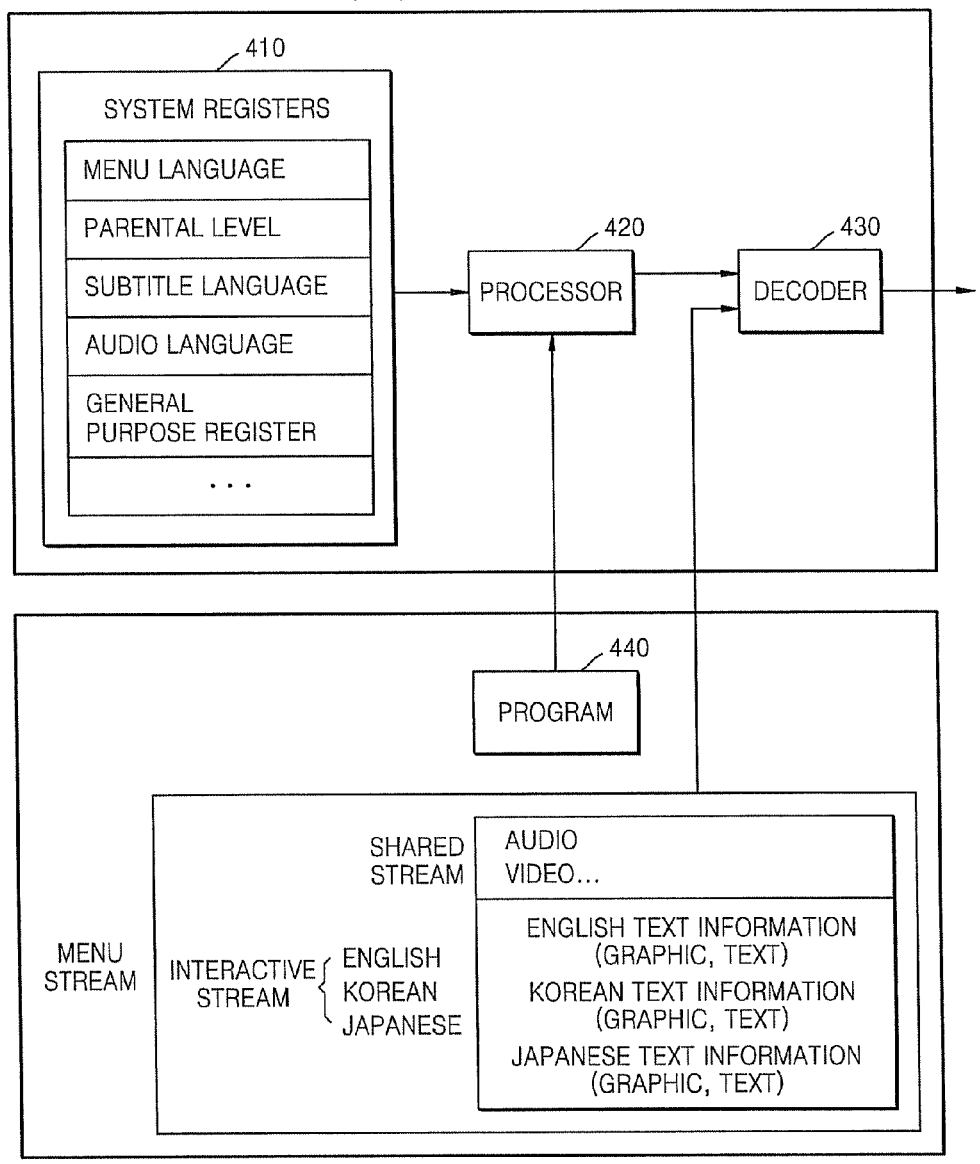
FIG. 4 is a block diagram of a reproducing apparatus of an interactive graphics stream according to an embodiment of the present invention.

FIG. 4 is a block diagram of a reproducing apparatus of an interactive graphics stream. Referring to FIG. 4, if the power is first supplied to the reproducing apparatus 400 or a user selects an interactive graphics stream for a menu, a processor 420 loads and executes a program 440. By using information preset in system registers 410, the program 440 selects one interactive graphics stream among a plurality of interactive graphics streams written according to a variety of attributes. The information present in the system registers 410 includes language information, parental level information, and subtitle language information. Accordingly, a decoder 430 reads and decodes one menu data referring to such various types of attribute information. The program 440 is a navigation command included in a program object that is a set of navigation commands and is executed before a playlist that is a command to reproduce an audiovisual (AV) stream is executed so that a user or a content author can select an interactive graphics stream. The system register 410 may be implemented as a plurality of shift registers, a memory or other kinds of storage.

There are many methods used to select one interactive graphics stream among a plurality of interactive graphics streams written according to a variety of attributes because system registers used to select an interactive graphics stream include various types of attribute information. One among the plurality of interactive graphics streams can be selected according to menu language information preset by a user or by a reproducing apparatus manufacturer. Alternatively, menus for adults and for children can be separately reproduced using preset view class information referred to as a parental level. Additionally, when no menu language is specified by a user, a predetermined menu based on a subtitle or audio language is reproduced and presented to the user. There is still another method in which by utilizing a general purpose register, a menu corresponding to a value stored in the register is reproduced.

Table 1 shows contents of a player status register (PSR):

| | Name | Description |
|---|---|---|
| 0 | Interactive Graphics | Interactive Graphics Stream Number |
| 1 | Audio | Audio Stream Number |
| 2 | Presentation Graphics | Presentation Graphics Stream Number |
| 3 | Angle | Angle Number |
| 4 | Title | Title Number |
| 5 | Chapter | Chapter Number |
| 6 | PlayList | PlayList Number |
| 7 | PlayItem | PlayItem Number |
| 8 | Presentation Time | Presentation Time in 90 Khz |
| 9 | Timer | Navigation Timer |
| 10 | Selected Button | Button Number in Selected State |
| 11 | — | reserved |
| 12 | — | reserved |
| 13 | Parental | Parental Level |
| 14 | Video Configuration | Player Configuration for Video |
| 15 | Audio Configuration | Player Configuration for Audio |
| 16 | Audio Language | Language Code for Audio |
| 17 | Subtitle Language | Language Code for Presentation Graphics |
| 18 | Menu Language | Language Code for Menu Description |
| 19 | Interactive Graphics Language | Language Code for Interactive Graphics |
| 20 | — | Reserved |
| ... | ... | ... |
| 63 | — | Reserved |

Referring to Table 1, it can be seen that various types of attribute information including language information and other information described above are recorded in a plurality of player status registers. For example, menu language information is recorded in register PSR 18, which is read first. If the value in the register corresponds to Korean (ko), a register PSR 0 is set to 0, and if the value corresponds to English (en), the register PSR 0 is set to 1. Then, a playlist is played. It is predetermined that an interactive graphics stream written in Korean or English is reproduced depending upon whether the value of register PSR 0 is 0 or 1.

Referring to FIG. 4, it can be seen that a menu stream comprises a shared stream such as audio and video, and as an example of an interactive graphics stream, text information written in a variety of languages. The text information written in a variety of languages may be comprised of text data and graphic data. FIG. 4 shows a case where this text information is included in the menu stream. For example, the shared stream is stored only once and navigation commands in each menu stream call predetermined portions of the shared stream as needed during reproduction of the menu stream.

If one language is selected by a user or by the reproducing apparatus manufacturer, the processor 420 transfers information regarding the selected language to the decoder 430, and the decoder 430 selects one interactive graphics stream among a plurality of multiplexed interactive graphics streams and decodes the selected interactive graphics stream. At this time, the data of the interactive graphics stream may have a variety of different formats, such as text and graphic formats, and usually has a graphic format.

Figure 5:
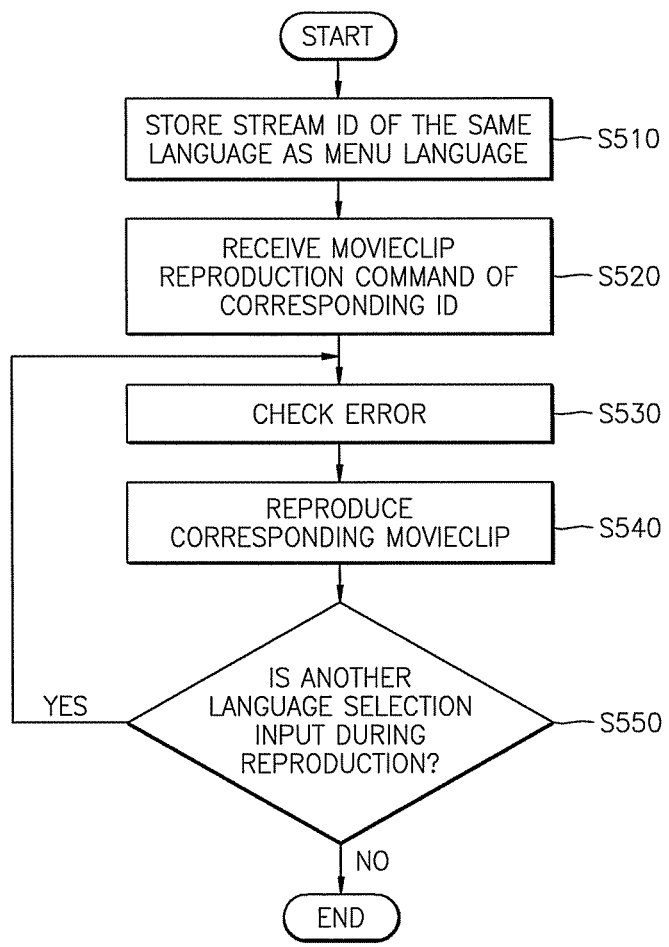
FIG. 5 is a flowchart of a method of selecting one interactive graphics stream among a plurality of interactive graphics streams based on language information according to an embodiment of the present invention.

FIG. 5 is a flowchart of a method of selecting one among a plurality of interactive graphics streams according to language information.

FIG. 5 shows a case where when power is supplied or a user command is provided, a program selects one interactive graphics stream and reproduces the selected interactive graphics stream, and a case where a movie is being reproduced, a program multiplexed with a movie stream selects one interactive graphics stream and reproduces the selected interactive graphics stream.

In a menu language register, information about language used in a menu is stored as a stream ID. First, an interactive graphics stream ID written in the same language as the menu language is stored in a predetermined register in operation S510. That is, the program finds ID information of an interactive graphics stream corresponding to a language stored in a menu language register, and stores it in a predetermined register storing a number allocated to the interactive graphics stream currently being reproduced. If there are no interactive graphics streams, a default value, for example, 0, is stored in the predetermined register.

After the stream ID is stored in the predetermined register, a command to reproduce a movieclip is received in operation S520. At this time, the movieclip may be a menu or movie contents formed with moving pictures. During reproduction of the interactive graphics stream, if an interactive graphics stream change program included in the interactive graphics stream is executed, new attribute information (i.e., language information in this embodiment) is obtained, and then an interactive graphics stream is selected according to the new attribute information and is read and reproduced. Before these operations are performed, an error check is performed in operation S530. In other words, if the interactive graphics stream change program included in the interactive graphics stream is executed during reproduction of the interactive graphics stream, it is determined whether an interactive graphics stream having the new attribute information is present in operation S530. The interactive graphics stream change program is a button command included in a button object.

To perform the determination, it is confirmed whether or not the value stored in the register is included in the interactive graphics stream number multiplexed in the selected movieclip. If the value is included, it is determined that the value is valid and the value already stored is maintained. If the value is not included, it is determined that the value is invalid and the value is replaced by a default value 0, and 0 is stored in the predetermined register. If there is a movieclip corresponding to the value stored in the register, the movieclip is decoded and reproduced in operation S540. When the movieclip is reproduced, if a command to select another language is received in operation S550, the process returns to operation S530 in which an error is checked.

Figure 6:
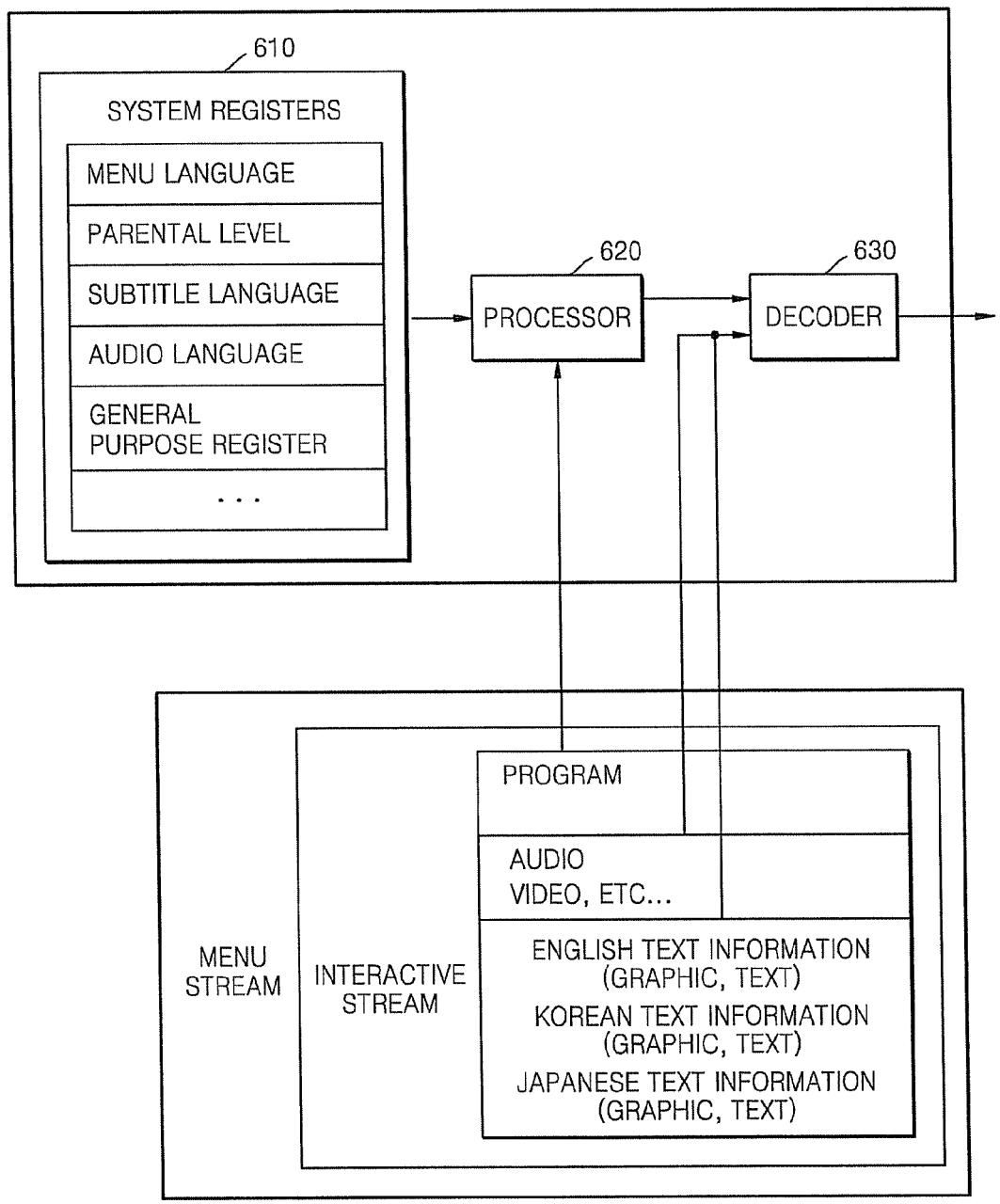
FIG. 6 is a schematic diagram showing the operations of the reproducing apparatus of FIG. 4 when an interactive graphics stream is included in a movieclip.

FIG. 6 is a schematic diagram showing the operations of a reproducing apparatus when an interactive graphics stream is included in a movieclip. Referring to FIG. 6, it can be seen that a program prepared in advance by a contents provider is included in a predetermined part of a movie stream. While executing this program, a processor 620 determines a menu stream by using the program itself, system register values 610 stored in the reproducing apparatus, a user's inputs, etc. The menu stream thus selected is decoded by a decoder 630 together with other streams such as audio and video streams and text information corresponding to the selected language.

The present invention may be embodied in a code, which can be read by a computer, on a computer readable recording medium. The computer readable recording medium includes all kinds of recording apparatuses on which computer readable data is stored. The computer readable recording media includes storage ROMs, RAMs, CD-ROMs, magnetic tapes, floppy disks, optical data storage devices, and also includes carrier waves (e.g., transmission over the Internet). Also, the computer readable recording media can be shared among computer systems connected through a network and can store and execute a computer readable code in a distributed mode.

According to the present invention, text information written in a variety of languages and data shared by those languages are multiplexed and stored in one menu stream such that data is not redundantly stored and less storage space is wasted. In addition, since a menu stream is selected using a program, content can be produced according to various types of attribute information.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of reproducing one interactive graphics stream among one or more interactive graphics streams from an information storage medium, via a reproduction apparatus providing a visual display of interactive graphics, comprising:

obtaining attribute information in a player status register in the reproducing apparatus; and reading and reproducing one interactive graphics stream corresponding to the obtained attribute information among one or more interactive graphics streams from the information storage medium, the interactive graphics stream being used to control reproduction of audio-visual data and being reproduced with the audio-visual data, wherein, when an interactive graphics stream corresponding to the obtained attribute information does not exist, the attribute information in the player status register is changed to a predetermined value.

2. The method of claim 1, wherein the one or more interactive graphics streams can be changed by navigation commands related to reproduction of audio-visual data and cannot be changed by a user's operation.

3. The method of claim 1, wherein, when an interactive graphics stream change program included in the reproduced interactive graphics stream is executed, further comprising reading and reproducing another interactive graphics stream selected according to new attribute information obtained by executing the interactive graphics stream change program.

4. The method of claim 3, wherein the reading and reproducing of the another interactive graphics stream selected according to the new attribute information comprises:

determining whether the another interactive graphics stream having the new attribute information is present; and when it is determined that the another interactive graphics stream having the new attribute information is present, reading and reproducing the another interactive graphics stream having the new attribute information.

5. The method of claim 3, wherein the interactive graphics stream change program is a button command included in a button object.

6. The method of claim 2, wherein the attribute information comprises menu language information, viewer class information, sub-title language information, and audio language information.

7. The method of claim 1, wherein the one interactive graphics stream has text information for each language and shares information not specific to a language with other interactive graphics streams.

8. The method of claim 2, wherein the attribute information relates to a menu language information, and the navigation commands selects the one interactive graphics stream to be reproduced with the audio-visual data based on the obtained attribute information without the user's operation.

* * * * *